United States Patent Office 3,430,317
Patented Mar. 4, 1969

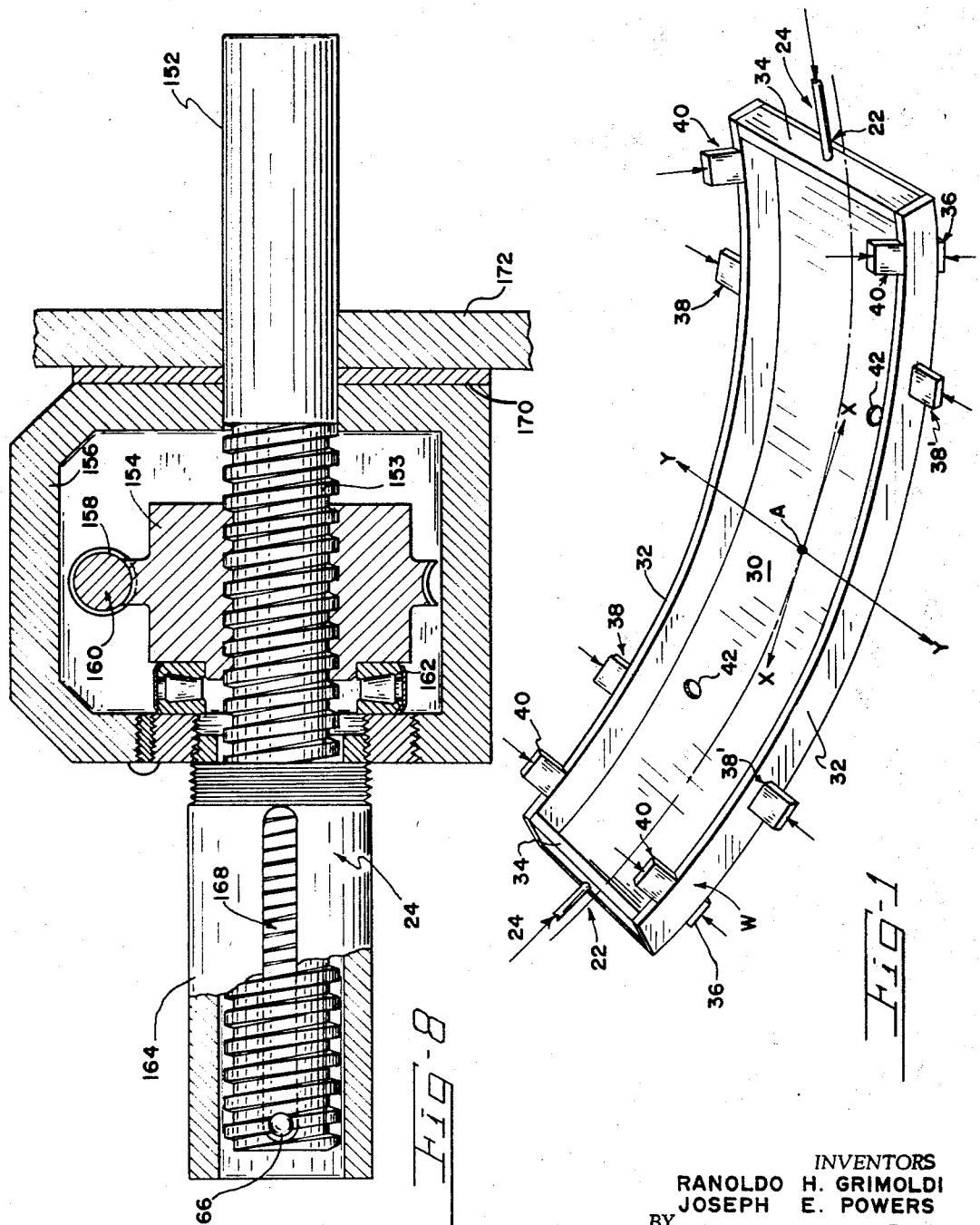

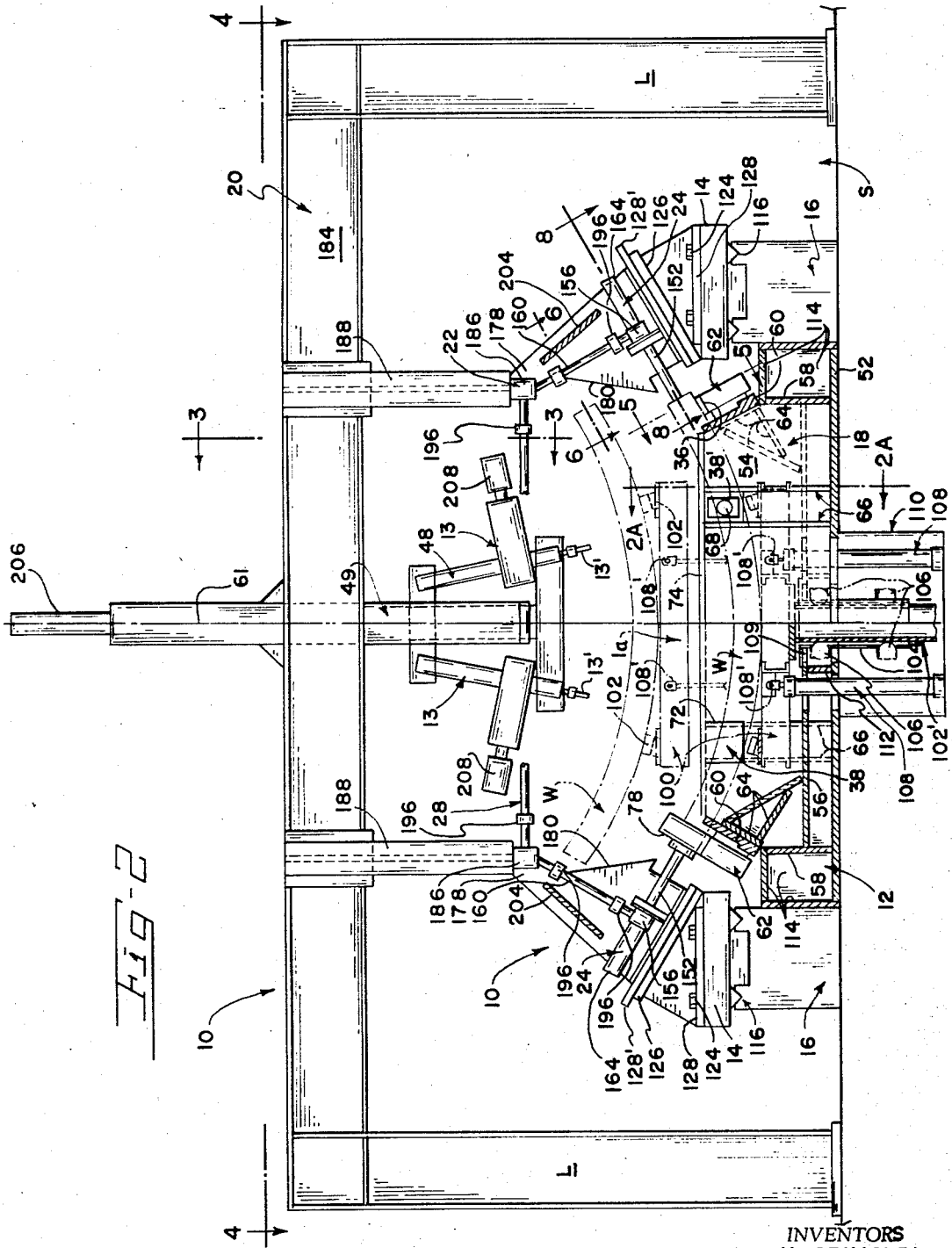

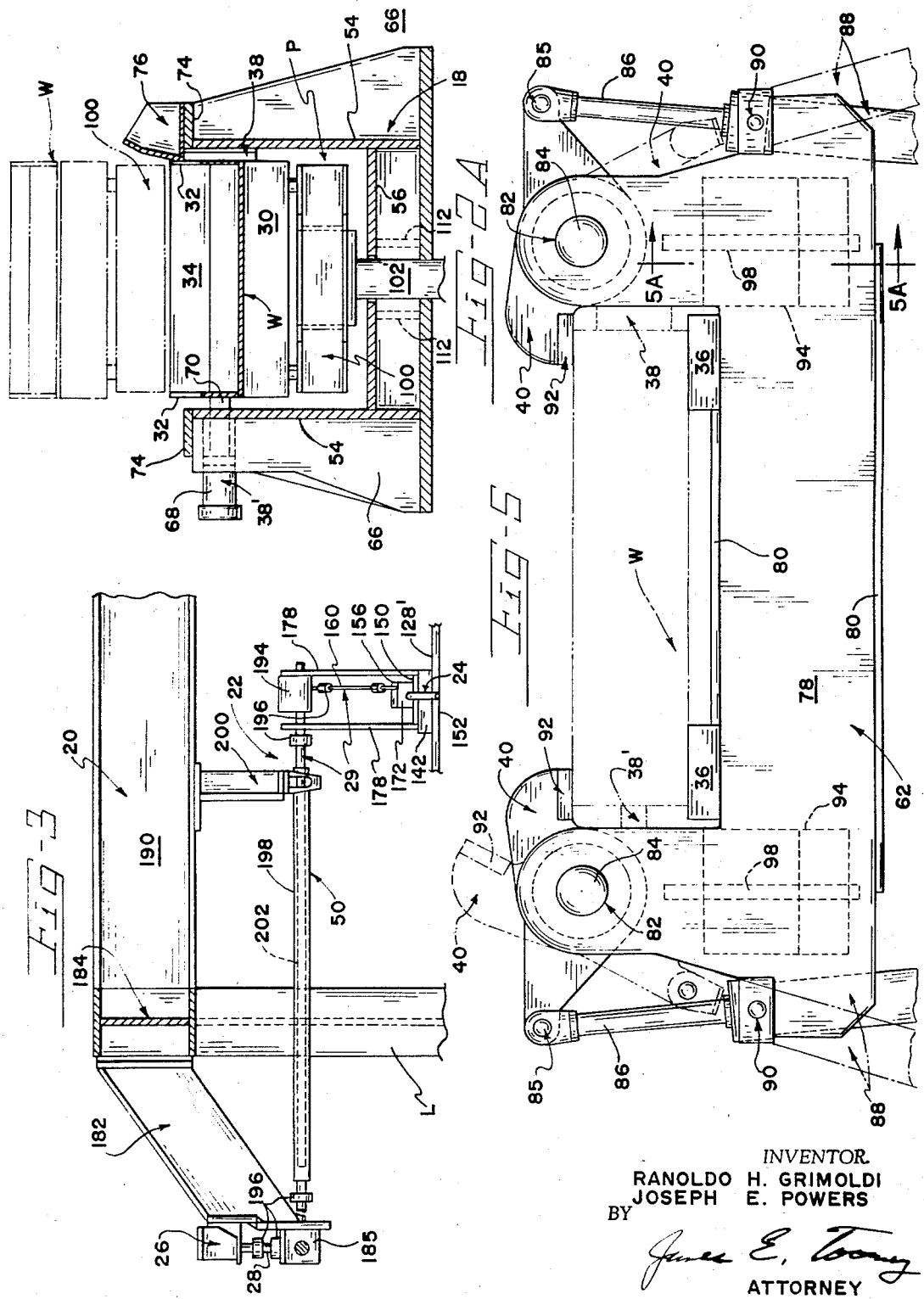

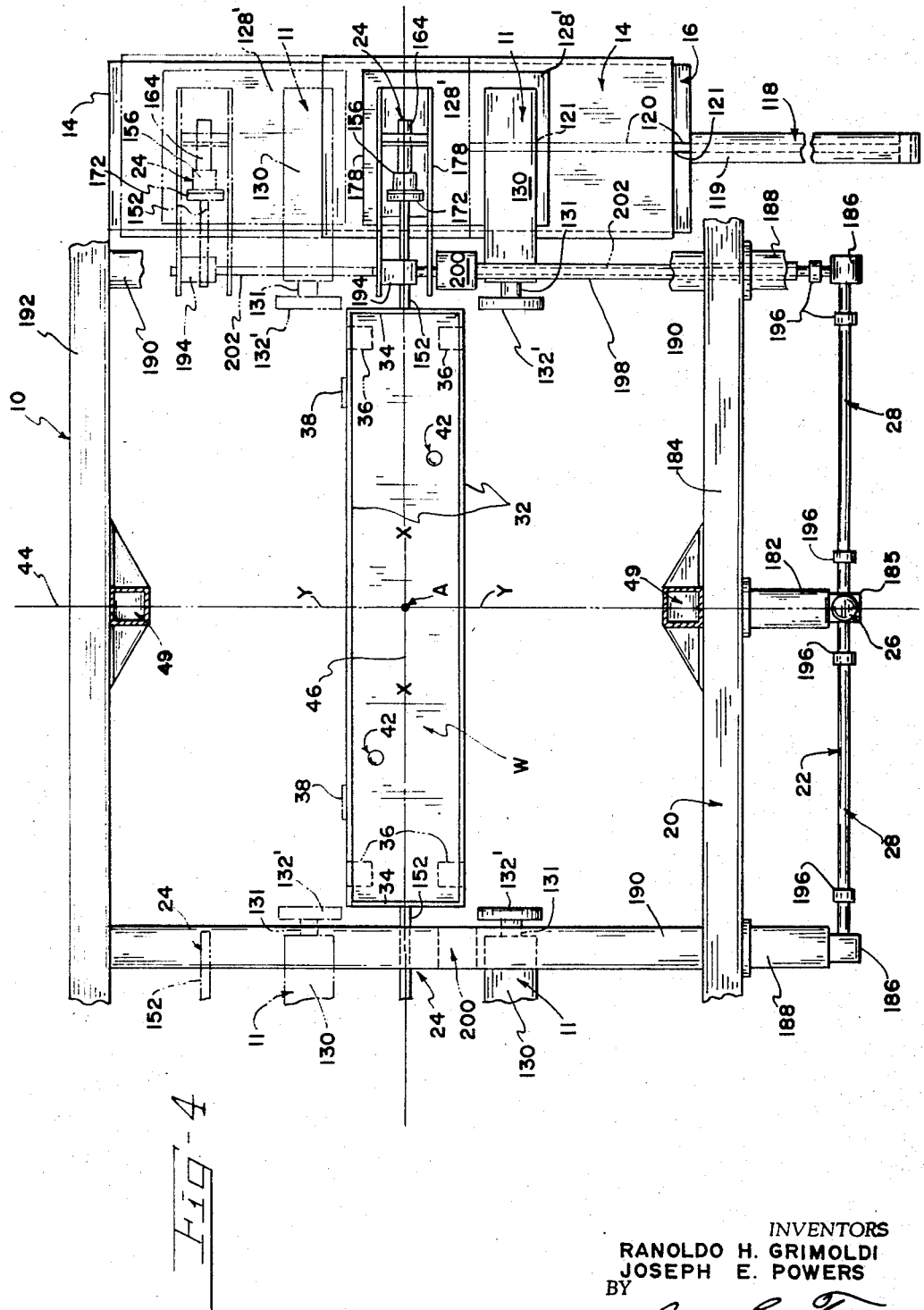

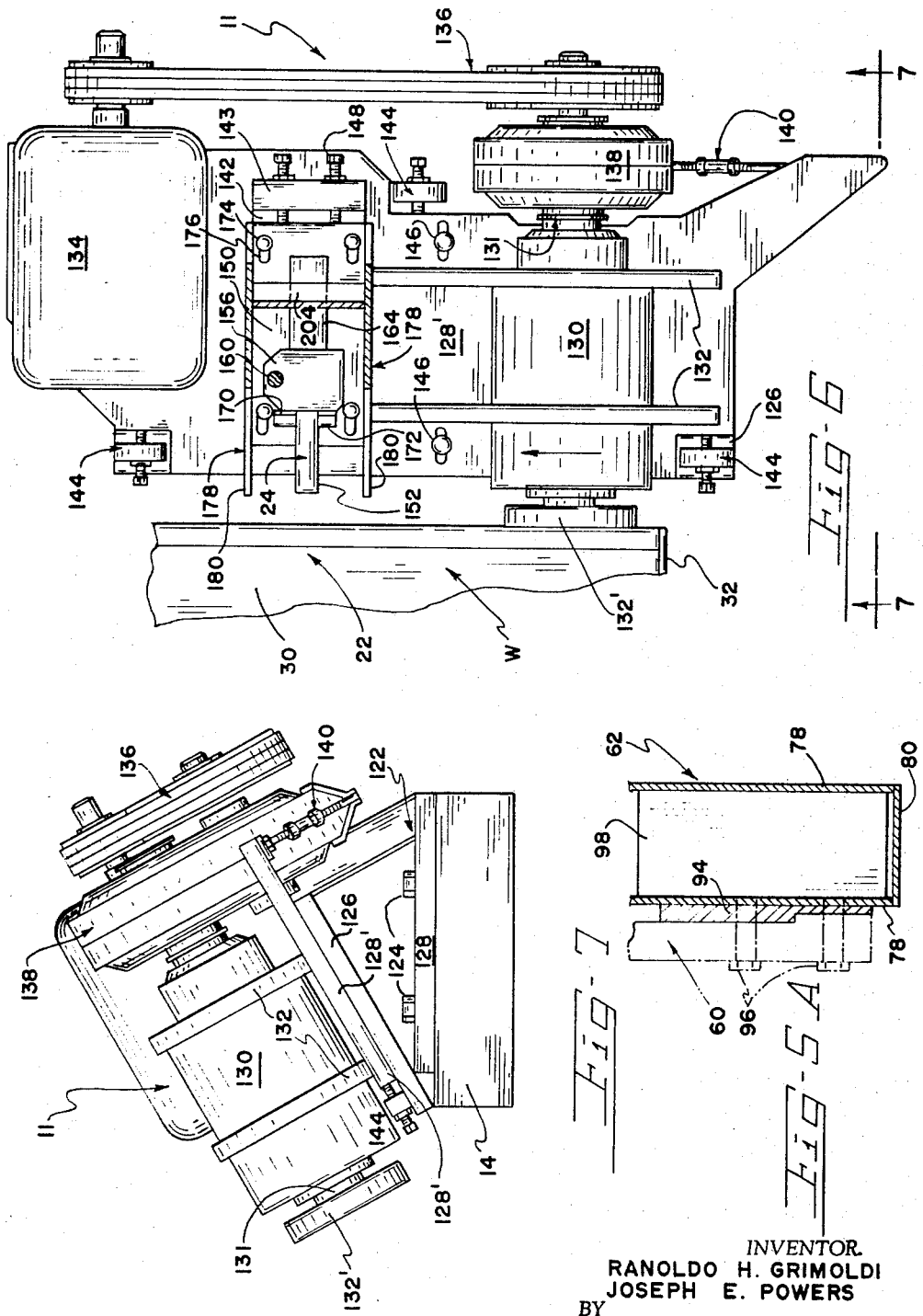

3,430,317
**COMBINED APPARATUS FOR POSITION-
ING, HOLDING AND OPERATING ON A
WORKPIECE**
Ranoldo H. Grimoldi and Joseph E. Powers, Napa, Calif.,
assignors to Kaiser Steel Corporation, Oakland, Calif.,
a corporation of Nevada
Filed Mar. 27, 1967, Ser. No. 626,133
U.S. Cl. 29—26        27 Claims
Int. Cl. B23b 39/06

ABSTRACT OF THE DISCLOSURE

An apparatus for precisely orienting a workpiece in a fixed position relative to a reference point on an apparatus which reference point is determined by the intersection of a pair of axes lying on the same plane and thereafter holding the workpiece in said position during a work performing operation. The apparatus properly orients and maintains the desired orientation of the workpiece thereon by means of a first series of workpiece positioning and holding elements acting along one axis and a second series of workpiece positioning and holding elements which act along the other intersecting axis. After precise positioning of the workpiece in the apparatus, the required operations such as milling and drilling of the workpiece are performed by other devices associated with the apparatus and during a portion of such operations the holding function of certain of the positioning and holding elements can be taken over by the work performing members.

Background of the invention

This invention relates to a combined apparatus for accurately positioning and then holding and operating on a workpiece, the design and operation of which minimizes human error. More particularly, it relates to an apparatus wherein improved means are employed for precisely orienting and then holding a workpiece in a work performing position, said means operating to engage various opposing ends of the workpiece to first effect an orientation of the workpiece and thereafter to hold the workpiece in the precise desired position during the work performing operation and wherein the work performing members can also advantageously function to assist in holding the workpiece in the desired holding position during the work performing operations.

Various apparatus have been designed in the past for positioning and holding the workpiece in the position to be worked on. These have not always been satisfactory for one or more reasons and certain of these apparatus are illustrated in U.S. Patent 3,127,661 to McConnell, granted Apr. 7, 1964, and U.S. Patent 3,187,547 to McClintic, granted Aug. 23, 1932. One of the principal deficiencies of these prior art apparatus resided in the fact that the elements used for workpiece positioning did not ultimately function as the final workpiece holders. This gap in functions permitted the introduction of human error which was carried over into the final work performing operation by failure of the work performing members to always maintain the close tolerances desired. Further, since the equipment was adopted primarily for manual operation of the various positioning and holding parts, this enhanced the introduction of human error as well as increasing the overall manufacturing cost due to the increase in time and amounts of manual efforts involved.

Summary of the instant invention

It is the primary purpose of the instant invention, therefore, to provide an improved apparatus for orienting and holding a workpiece in a work performing position wherein the same elements can perform the dual function of orienting and then holding the workpiece. These elements thus are error compensating so that a minimum of time and manual operation of the apparatus is involved and a maximum efficiency in a work performing operation is obtained particularly where the workpiece is of a complex or somewhat irregular shape.

Brief description of the drawings

In the accompanying drawings:

FIG. 1 is a perspective view of one type of workpiece that can be handled by the apparatus of the instant invention and diagrammatically illustrates the manner in which the workpiece is precisely positioned in the apparatus relative to a fixed point A as determined by the intersection of an X and Y axes lying in a common plane;

FIG. 2 is a front elevational view of a preferred embodiment of the apparatus of the instant invention, with certain parts being shown in dotted lines, with other parts broken away, and certain parts being shown in section and illustrates both an elevated and lowered position of the workpiece in the apparatus;

FIG. 2A is an enlarged sectional view generally taken along line 2A—2A of FIG. 2 and illustrates certain details of the apparatus;

FIG. 3 is a sectional view taken along line 3—3 of FIG. 2, with certain parts removed and other parts broken away and illustrates details of certain positioning elements of the instant apparatus;

FIG. 4 is a top diagrammatic plan view of the apparatus of FIG. 2 when taken generally along line 4—4 thereof, with certain parts broken away and with other parts being shown in dotted and solid lines and illustrates various positions of a work performing member and certain positioning pins relative to the workpiece disposed in the apparatus;

FIG. 5 is an enlarged elevational sectional view generally taken along line 5—5 of FIG. 2 and illustrates in some detail one of the workpiece hold down and locating devices used with the instant apparatus;

FIG. 5A is a sectional view taken along line 5A—5A of FIG. 5 wherein certain parts, shown in dotted lines, have been added;

FIG. 6 is a broken away sectional view taken generally along line 6—6 of FIG. 2 and illustrates one of the opposite ends of the positioned workpiece being subjected to a finishing operation by a machining device;

FIG. 7 is an elevational view taken along line 7—7 of FIG. 6 with parts removed; and FIG. 8 is an enlarged and partial longitudinal sectional view taken along line 8—8 of FIG. 2 with parts removed and illustrates certain details of one of the positioning pin elements used in the apparatus of the instant invention.

Detailed description

With further reference to the drawings, and particularly FIGS. 1–4, a preferred embodiment of the combined workpiece positioning, holding and operating apparatus of the instant invention generally comprises a framework 10 made up of a lower frame 12, a super-structure 20 overlying and spaced from the frame 12, a first positioning mechanism generally indicated at 22, a second positioning mechanism generally indicated at 38, and milling and drilling devices 11 and 13. The several upright legs L of super-structure 20 support appropriate I-beams and channel-like beams.

Associated with lower frame 12 is a pair of spaced and parallel beds 16 affixed to a floor surface S. A table 14 is mounted for reciprocating movement on each bed 16 and a work holder 18 is disposed between and interconnected to opposing sides of the beds 16. In a sense, the lower structure 12 of the apparatus 10 can be considered as being somewhat H-shaped in plan and generally made up of the aforementioned and interconnected members 14, 16 and 18.

As indicated particularly in FIGS. 2 and 4, the unique positioning mechanism 22 noted above comprises a pair of pin means 24 affixed to tables 14 and operatively connected to a shaft means 28 driven by a common drive 26 suspended from super-structure 20. As indicated in FIG. 3, pin means 24 always maintain a driving connection to the common drive 26 by virtue of the telescopic shaft connection 50 of the shaft means 28.

As noted in FIG. 1, the workpiece W to be worked on can be comprised of an arcuate skin of heavy steel plate 30, a pair of curved steel side flanges 32 and a pair of steel flat end plates 34 of the same general height as side flanges 32. Although not shown in FIG. 1, various cross-stiffeners arranged in any desired fashion can be disposed on the concave surface of the skin plate intermediate the side flanges 32 and/or end plates 34.

The instant workpiece W can be a tunnel liner segment of a predetermined size. When a plurality of such segments is assembled together, they can form a tunnel ring. A series of such rings when interfitted together along a common axis form a desired unit length of a tunnel. In order to form such a tunnel, the adjoining segments W must interfit with each other in a precise fashion. The instant apparatus is concerned with finishing the individual sections in order to provide precisely interfitting parts and, in effect, to make each tunnel liner segment a mirror image or an exact reproduction of every other tunnel liner segment for a given ring. The problem of producing such a tunnel liner segment is, of course, aggravated by being of arcuate shape. In addition to finishing the opposite ends of the workpiece W, drills 13' can be used to drill and tap any number of holes, such as holes 42, in the skin plate 30. As a consequence, the importance of the workpiece being located and held in a precise position at all times, as it is being worked on by the work performing members, will be readily seen.

In initially positioning the workpiece W in holder 18, the workpiece W is roughly oriented along both the X and Y axes of FIG. 1. During this initial orientation, work holder 18 also acts to prevent the workpiece from rocking out of its desired position in the work holder. Since, at this time, the workpiece is only roughly oriented in the work holder 18, means are provided, which will now be described, for shifting the workpiece W in one or more directions to effect the lining up of the workpiece precisely along an X and Y axes, which are ultimate and precise reference axes for operating on the workpiece.

The aforesaid restraint required during this final jogging of the workpiece into position is advantageously effected by means of vertically and horizontally disposed restraining pads 38 and 36 on work holder 18. The workpiece W is brought into nesting engagement with these pads by means of an elevatable and workpiece receiving platform 100.

The work holder 18 can be an integral part of the lower structure 12 and can be made up of a series of plate members including a flat base plate 52, a pair of vertical and laterally spaced side plates 54 and a pair of end plates 58, all welded together. The flat base plate 52 is anchored to the floor S and extends the full length of the work holder 18. The side plates 54 of relatively shorter length than the base plate 52 are disposed with their lower edges in engagement with surface portions of the base plate 52 inwardly of and parallel to the longitudinal edges thereof. A bottom plate 56, also connected to side and end plates 54 and 58, acts in conjunction with plates 54 and 58 to define the width, breadth and depth of an open recess or pocket P in the work holder 18 for receiving the workpiece W. The end plates 58 as is evident in FIG. 2 are of relatively shorter height than the side plates 54 in order that the upper corner ends of the vertical plates 54 at the longitudinal ends of the work holder 18 can be beveled upwardly and inwardly in a corresponding manner in order to facilitate the bridging of the stepped mounting plates 60 thereacross.

Workpiece locating and hold down devices 62 are attached to plates 60 and each device includes a series of locating pads 36 and rocker arms 40. In order to assure rigid attachment of the locating and hold down devices 62 to the mounting plates 60, each plate 60 is reinforced by a series of plates 64 disposed underneath and rigidly connected to plate 60. Plates 64 also extend fully between and are interconnected to the vertical side plates 54 of the work holder 18. The plates 64, in effect, form a triangulated box support for a plate 60.

Since the hold down and locating devices 62 attached to the mounting plate 60 at each end of the work holder 18 are identical, a description of one will suffice for both. Each device, which is U-shaped as shown in FIGS. 2, 5 and 5A, is generally comprised of a pair of plate 78 bridged by upper and lower strips 80. The upper strip 80 is of shorter length than lower strip 80 so as to accommodate a pair of workpiece locating pads 36 at either end thereof. A pair of aligned openings 82 in the upper portion of spaced plates 78 carries a stub shaft 84 which supports a rocker arm 40. The outer end of each rocker arm 40 is suitably connected at 85 to the free rod end 86 of a fluid actuator 88 appropriately disposed between both spaced U-shaped plates 78 and pointally connected thereto at point 90. The opposing ends of the rocker arms 40 include stepped recessed portions to which are affixed flat plates 92 used to clampingly engage the upper edge portions of the side flanges 34 of the workpiece W after disposal of the workpiece W in the pocket P and after all of the rocker arms 40 have been pivoted to the closed position shown in solid lines in FIG. 5 by operation of the fluid actuators 88. When rocker arms 40 are pivoted in the reverse direction and to the open position shown by the dotted lines in FIG. 5, sufficient clearance space will exist between the opposed opened rocker arms 40 of both devices 62 to permit free passage of the workpiece W therebetween when the workpiece is either lowered into or raised out of pocket P.

As indicated in FIGS. 2, 5 and 5A, a series of stepped mounting pads 94 affixed to opposite ends of the inside plate 78 of device 62 can be used to assist in anchoring each device 62 to its associated plate 60 on the work holder 18 through the medium of anchor bolts 96. It is to be understood that sufficient openings are cut out in the triangulated box made up of plates 64 to allow free access to and adjustment of bolts 96 in the aligned openings of plates 60 and pads 94.

Having described the hold down and locating devices 62, the structure and location of the other workpiece, locating pads 38 which cooperate with devices 62 will now be described.

Accordingly, the work holder 18 further includes four hollow mounts made up of plates 66 secured at various edge portions thereof to both side plates 54 and base plate 52.

Located within each of the two mounts on one side plate 54 of the work holder 18 as viewed in FIGS. 2 and 2A is a clamping device 38' made up of a fluid actuator 68. The rod end 70 of the actuator 68 passes through an opening (not shown) in the front plate 54 and is aligned with a locating pad 38. Pad 38, for each clamping device 38', is affixed to the inside of the other side plate 54 and at the upper end thereof in alignment with one of the two mounts on the outside thereof. From the above it will be observed that both clamping devices 38' and their associated pads 38 cooperate to engage and sandwich therebetween the side flanges 32 of the workpiece W, and they further act at the same time in conjunction with the aforedescribed hold down and locating devices 62, as is evident in FIG. 5, to positively position and secure workpiece W to holder 18.

The upper end of each side plate 54 of the work holder 18 and the upper ends of the plates 66 associated therewith are covered by a flange 74 and the right side plate 54 as viewed in FIG. 2A can also include one or more guides 76 for use in directing the workpiece W into the pocket P upon the lowering of platform 100 into pocket P.

The workpiece handling platform 100 made up of appropriately assembled channel-shaped elements includes upwardly facing shoes 102 which serve as mounts for a series of longitudinally aligned idler rolls. These rolls are adapted to rollingly engage the skin plate 30 and stabilize the workpiece W in an upright position thereon when platform 100 receives the workpiece W from a suitable conveyor or the like (not shown). The platform 100 includes a stem 102' which passes through a sleeve 104 disposed in the openings 109 in the bottom plate 56 and base palte 52. Rollers 106 affixed to sleeve 104 operate to maintain proper registry between the stem 102' and sleeve 104 during the reciprocation of stem 102' within sleeve 104. Fluid actuators 108 anchored in the well 110 of floor S and pivotally connected at 108' to platform 100 on either side of the stem 102' are used to raise and lower the paltform 100 relative to work holder 18. Reinforcing strips 112 disposed between bottom plate 56 and base plate 52 are arranged in a suitable pattern and reinforce the openings 109 for disposition of the sleeve 104 therein.

As indicated particularly in FIG. 2, work holder 18 has outer reduced end portions made up of plates 114 which extend beyond the end plates 58. Plates 114 operate to connect the base plate 52 of work holder 18 to the beds 16.

Since each table 14 and bed 16 is similarly constructed and arranged relative to the other, a description of one assocated table and bed will suffice for both sets of tables and beds. As indicated particularly in FIG. 2, conventional runner and way assemblies 116 are used to slidably mount a table 14 on a bed 16. A fluid actautor 118 comprised of a cylinder 119 and piston rod assembly 120 disposed within the cylinder can be used to actuate a table 14 on a bed 16. The cylinder 119 is usually affixed to one end of the bed 16 while the exposed and free end 121 of the piston rod assembly 120 is connected to the end of the table 14 disposed adjacent the one end of the bed 16.

Located on top of and intermediate the ends of the table 14 by way of cap screws 124 is a fixture 122. Fixture 122 includes a series of inclined plates 126 and 128 for enabling adjustable attachment of a plate 128' to the topmost plate 126 thereof.

The plate 128' advantageously mounts the milling device 11 and the pin means 24 in laterally spaced relation to each other in order that the pin means 24 and milling cutter 132' of the device 11 can separately engage the associated opposite end of the workpiece W disposed within the work holder 18. Accordingly, a pair of apertured and upright parallel and spaced plates 132 are affixed at their lower edges to surface portions of the plate 128' at the lower end thereof as viewed in FIG. 6. A spindle housing 130 which carries a rotatable spindle 131 fits within the aligned openings of the plates 132 and is secured to the plates 132 in a conventional fashion. One end of spindle 131 carries a milling cutter 132' while the other end thereof carries a speed reduction gear case 138. A motor 134 mounted at the other end of plate 128' drives the input shaft of the gear case 138 by an appropriate belt-pulley drive system 136. An adjustable linkage means 140 anchors the housing of the case 138 to the plate 128'. Although only one cutter 132' is shown for finishing the associated opposite end of the workpiece W, any number of work performing elements can be mounted on the plate 128'. For example, a groove and a surface finishing operation could be simultaneously performed on the associated opposite end of the workpiece W.

A raised pad 142, only part of which is shown, is located on plate 128' between the drive motor 134 and spindle housing 130 for mounting the positioning pin means 24. The axes of the pin means 24 and the milling spindle 131 are arranged relative to each other on the plate 128' whereby, when the rod 120 of the actuator 118 is fully retracted as shown in FIG. 4, the axis of the pin means 24 is preferably aligned with the axis 46 of the apparatus 10 which also corresponds to the positioning axis X of the workpiece W while the axis of the milling cutter 132' is sufficiently offset relative to the axis 46 whereby the cutter clears the workpiece W during the initial positioning of the workpiece. In other words, when both actuators 118 (only one of which is shown in FIG. 4) are fully retracted this time, both pin means 24 are aligned with the X axis of the workpiece W. In the normal operation of the apparatus, it is contemplated that the pin means 24 will first be extended to engage the ends of the workpiece so as to precisely position the workpiece endwise relative to the reference axes point of intersection at point A. Thereafter, top and side clamping devices 40 and 38' are actuated to secure the workpiece in the precise working position desired. After the aforesaid clamping, pin means 24 are retracted, the cutters 132 are allowed to sweep across or traverse the ends of the workpiece under the urging of actuators 118. It is to be observed here that upon retraction of pin means 24 the cutters 132' advantageously take over the holding and positioning function of both pin means 24 during their sweep across the ends of the workpiece. The means for effecting the aforesaid operation will now be described.

Each positioning pin means 24, as illustrated in FIGS. 6 and 8, is made up of an advanceable pin 152 carried within a worm transfer gear case 156 connected to the lower end of the endmost shaft 160 of shaft means 28. The worm wheel 154 disposed in a case 156 meshes with a worm gear 158 provided on the lower end of the shaft 160 bearingly disposed in aligned openings in the gear case 156. The worm wheel 154 is advantageously separated from the opening through the rear wall of the housing 156 by a conventional thrust bearing 162. A cylindrical sleeve 164 projects beyond the rear wall of the housing 156 and is externally threaded at one end for connection to the opening therein and the threaded end portion 153 of pin 152 is freely disposed within the sleeve 164 as well as within the bore of wheel 154. A radially projecting stop 166 provided on the outer extremity of the threaded end 153 of the pin 152 extends into the elongated slot 168 formed in the sleeve 164 between the ends thereof whereby upon rotation of the worm wheel 154 in either direction by the intermeshing gear 158 on the rotatable shaft 160 the pin 152 is axially advanced relative to the worm wheel 154 and the sleeve 164. In order to limit the stroke advancement of the pin 152 in either direction, appropriate limit switch devices (not shown) are provided and are arranged in such a manner that the stop 166 is not sheared off at either end of the slot 168 nor is the threaded end 153 of the pin 152 frictionally locked to the worm wheel 154 during extension or retraction of the pin 152 relative to the gear case 156.

The gear housing 156 for each pin 152 is affixed to the mounting plate 150 by a flange 170 attached to the forward wall of the housing 156 and a further flange 172 affixed directly to plate 150. The mounting plate 150 is adjustably mounted to pad 142 on the plate 128 by slot and cap screws 176 and 174 on pad 142. In order to make minute positioning adjustments of pin means 24 relative to the associated ends of the workpiece, the pad 142 can be provided with a backup flange 143 which carries the set screws 148 for engaging the plate 150 of pin means 24. The importance of adjusting the pin means 24 will become more apparent hereinafter.

In an advantageous embodiment of the invention, a pair of plates 178 provided with inclined surfaces 180 are affixed to the plate 150 on each side of gear case 156. These plates have the dual function of protecting pins 152 while simultaneously acting as a track means for guiding the workpiece into the desired working position upon lowering of platform 100 into the work holder 18.

The lower ends of the surfaces 180 terminate above the pins 152 while extending beyond the retracted position of the pin 152 as best shown in FIG. 6. Thus when the workpiece W is lowered by platform 100 into the work holder 18, the aforesaid surfaces 180 will, if necessary, compensate for any offsetness of the workpiece and act to direct the workpiece W into the desired working position within the work holder 18.

As noted in FIG. 4, the common drive for all the pin means 22 is comprised of a reversible hydraulic motor 26 suspended from a bracket 182 affixed to a beam 184 of superstructure 20. A gear transfer case 185 is used to direct the output of motor 26 immediately to the opposed shafts 28 suspended from brackets 182 and 188 on cross beam 184. Shafts 28 are linked to further gear transfer cases 186 also suspended by means of brackets 188 on cross beam 184. Each gear case 186 is finally interconnected by other shafts of the shaft means 28 to a further gear transfer case 194 disposed between the upper ends of the guard plates 78 on each pin means 24.

As indicated particularly in FIG. 3, the gear transfer case 194 can be affixed to one of the upper ends of the guard plates 178. It is to be understood that the gear transfer cases 185, 186 and 194 are made up of suitable bevel gears for transferring rotation of the shafts of the various shaft means arranged in one direction to other shafts of the shaft means disposed at right angles thereto. In order to facilitate the connections of various lengths of shafts making up the shaft means 28 from the common hydraulic motor 26 to the endmost shaft 160 connected to worm wheel 154 as aforedescribed, an appropriate number of adjustable coupling elements 196 are associated with the ends of the various shafts of the shaft means 28.

As further indicated in FIG. 3, and by virtue of both pin means 24 being mounted on the reciprocable tables 14, a telescoping shaft arrangement 50 is disposed between the gear transfer cases 186 and 194 so as to maintain constant connection between common drive 26 and both pin means 24 irrespective of the position of pin means 24 and table 14 on bed 16. This telescopic assembly includes an outer tube 198 rotatably mounted at one end on a bracket 200 suspended from a top cross beam 190. An inner tube 202 is spline connected to and fits within tube 202 while being rotatably supported at one end in aligned openings of guard plates 178 attached to a pin means 24 and the gear case 194 disposed between and mounted on one of the plates 178 all as noted in FIG. 3. If desired, a bridge and stiffener element 204 can be disposed between the guard plates 178. By virtue of the aforesaid connecting arrangement, it will now be evident that all of the pin means 24 can be simultaneously driven in either direction.

Although not heretofore mentioned, it is to be understood that fixture 122 is adjustably located on a table 14 by the cap screws 124 whereby precise positioning of the fixture can be obtained. Further, in order to fix the depth of cut of the individual cutters 132', the mounting plates 128' therefor can be adjusted relative to top plate 126 by way of the lug and set screw means 144 as shown in FIG. 6.

Apart from the adjustments of the fixtures 122 to their tables 14 and the milling cutters on table 128' relative to the top plate 126 of the fixture 122 for determining the depth of cut, the pin means 24 have to be adjusted relative to each other as well as relative to their associated end of the workpiece W. Accordingly, the cap screws and slots 174 and 176 and set screws 148 associated with each pin means 24 can be used to fixedly locate both pin means 24 in correspondingly spaced relation from their associated end of the workpiece W.

Even though the pin means 24 are now precisely located relative to the workpiece, the pins 152 thereof may still not be in corresponding zero starting position relative to each other. Consequently, the aforementioned couplers 196 include intermeshing and intercoupling gear arrangements not shown that permit the interconnected shafts of the shaft means associated with any one coupler 196 to be rotatably indexed relative to each other as well as angularly and axially adjusted relative to each other. Thus, if the interconnected shafts of the shaft means 28 between any successive gear cases, for example 186 and 194, are somewhat short in overall length during assembly, the intermeshing gears of the coupler 196 will usually provide the necessary compensation therefor. Further, if successive gear cases 186 and 194 are out of alignment, such as due to positioning of the pin means 24, the intermeshing gears of the couplers 196 allow for some angular adjustment of the interconnecting shafts of the shaft means 24 relative to each other. Finally, the pins 152 of both pin means can be adjusted relative to each other to a corresponding zero starting position after location of the pin means 24 relative to their associated workpiece ends by rotatably indexing the intermeshing gears of the couplers 196 in a known fashion.

During machining of the opposite ends of the workpiece W, the drilling devices 13 can also be lowered by appropriate means into position over the skin plate 30 in order that the drill-tap tools 13' upon being rotated by motors 208 can effect drilling and threading of the holes 42 in the skin plate 30. The drilling devices 13 are mounted on a carriage means 48 which is slidably connected to the sub-frame 49 in a suitable manner and advanced relative thereto by an actuator 206 affixed to the upper end of the sub-frame 49 and interconnected to the upper end (not shown) of the carriage means 48. Thus the carriage means 48 can be advanced toward or away from the skin plate 30 of the workpiece W by the actuator 206 whereby the holes 42 in the skin plate 30 can be drilled and threaded by the combined tools 13'.

In order to precisely position and machine each workpiece W, an appropriate control circuit (not shown) can cyclically synchronize the movements and operations of various elements of the apparatus 10, such as the platform 100, the clamping devices 38' and 40, the positioning mechanism 22, both tables 14, carriage means 48 and the operation of the milling and drilling devices 11 and 13. It is contemplated that the control circuit would include appropriate interlocks whereby none of the movable or operable elements of the apparatus 10 can be actuated out of proper sequence.

In summary, the workpiece W is first disposed in a suitable manner and in a rough working position on the raised platform 100 as shown in FIG. 2 and is further handled on the platform 100, if necessary, by the edges 180 of the guard plates 178 engaging the opposite ends of the workpiece W during lowering of the platform. Thus, even though the workpiece is of irregular shape, the guard plates 180 and platform 100 cooperate together so as not to drop the workpiece W off the platform 100 while at the same time positioning the workpiece W in a rough working position in the work holder 18. Once the workpiece W is lowered into the work holder 18, the platform 100 drops clear of the workpiece W due to the locating pads 36 nestingly engaging the convex side of the workpiece W in order to orient the workpiece W into an approximate working position along reference axes X and Y. Then the clamping devices 38' are initially actuated to snugly but loosely clamp the side flanges of the workpiece between the clamping devices 38' and locating pads 38 whereby the opposite ends of the workpiece W are lined up relative to reference axis Y. Both pins 152 of the pin means are then simultaneously actuated to abuttingly engage the opposite ends of the sandwiched workpiece in order to precisely line up the workpiece W relative to intersection point A of the reference axes X and Y. With the pins 152 holding the workpiece W in precise position, the clamps 38' are further actuated along with actuation of the rocker arms 40 to positively secure the workpiece W to the work holder. The initial snug positioning of the workpiece W between the locating pads 38 and clamping devices 38' assures precise positioning of the workpiece and the holding thereof by the pins 152 as well as avoidance of the workpiece W being inadvertently misaligned within the work holder once it is workingly positioned therein by the lowering of the platform 100. After retraction of both pin means 24, operations can be performed on the workpiece W by the milling and drilling devices 11 and 13 as aforedescribed whereby the milling devices 11 in acting simultaneously on opposite ends of the workpiece W significantly contribute to holding the secured workpiece W in its precise position. Upon completion of the work performing operations, the actuators 38' and rocker arms 40 are fully withdrawn and the workpiece W is free of the work holder 18 and raised thereabove by the platform 100 to a subsequent processing station whereby the instant apparatus is readied for positioning, holding and operating on the next workpiece W in a repetitive cycle. Further, during withdrawal of the workpiece W from the work holder 18, the usual operation is to return both milling devices 11 to their starting positions by retraction of the piston rod assemblies 120 into their associated cylinders 119 so that the tables 14 carrying the devices 11 are moved relative to the beds 16 and in a downward direction as viewed in FIG. 4.

Although the positioning and holding mechanism 22 of the instant invention has been described with particular reference to an arcuate tunnel liner segment, it is obvious that it can be used to precisely position and hold a flat workpiece in a working position. In addition, both simultaneously actuatable positioning pin means 24 could be mounted instead on fixed portions of an apparatus in contrast to the reciprocal tables 14. Although the pin means have incorporated pins 152 for engaging the workpiece W, any suitable engaging means can be used, such as advanceable flat pads. Furthermore, the apparatus could perform other operations on the precisely positioned and secured workpiece W such as weldable assembly of other components thereto or even other machining operations such as surface grinding on the concave side of the skin plate 30 thereof. The structure and operation of the instant device is such that it admirably lends itself to mass production operations.

Advantageous embodiments of the instant invention have been disclosed and described. It is obvious that various changes and modifications may be made therein without departing from the spirit and scope thereof as defined by the following appended claims, wherein:

What is claimed is:

1. An apparatus for orienting and holding a workpiece in a work performing position as determined by a reference point located at the point of intersection of a pair of axes disposed in a common plane, and for performing work on said workpiece, said apparatus comprising the combination of support means for slidably engaging the workpiece and initially orienting said workpiece relative to said reference point, movable workpiece engaging pin means for engaging opposing portions of said workpiece for precisely orienting said workpiece relative to said reference point, common means for simultaneously moving said pin means into and out of engagement with said workpiece, and means including work performing elements for maintaining the workpiece in the oriented and precise reference point position during the work performing operation.

2. An apparatus as set forth in claim 1 wherein said last mentioned means also includes a workpiece clamping means.

3. An apparatus as set forth in claim 1 wherein said common means are operable to disengage said pin means from the workpiece during the work performing operation so as to allow full freedom of operation of work performing elements on the workpiece, and means for operating said common means in the aforesaid fashion.

4. An apparatus as set forth in claim 2 wherein said clamping means includes pad means for adjusting the workpiece relative to said reference point but in a direction different from said pin means.

5. An apparatus as set forth in claim 4 in which said clamping means are comprised of a series of articulated arms and cooperating pins.

6. An apparatus as set forth in claim 1 wherein the work performing elements traverse opposing portions of the workpiece and means for effecting the traversal of said work performing elements across the workpiece.

7. An apparatus as set forth in claim 1 including track means associated with said pin means for use in initially directing the workpiece toward the finally desired working position.

8. An apparatus as set forth in claim 1 including further work performing elements for acting on an intermediate portion of the workpiece.

9. An apparatus as set forth in claim 1 including platform means for lowering the workpiece onto said support means and track means associated with said platform means for initially directing the workpiece toward the finally desired working position on said support means.

10. An apparatus for orienting and holding a workpiece in a work performing position as determined by a reference point located at the point of intersection of a pair of axes disposed in a common plane and for performing work on said workpiece, said apparatus comprising the combination of support means for slidably engaging the workpiece and initially orienting said workpiece relative to said reference point, a movable workpiece engaging pin means for engaging opposing portions of said workpiece for precisely orienting said workpiece relative to said reference point, common means for simultaneously moving said pin means into and out of engagement with said workpiece, means including work performing elements for maintaining the workpiece in the oriented and precise reference point position during the work performing operation, and means for effecting the traversal of at least one of said work performing elements across one of the opposing portions of said workpiece.

11. An apparatus as set forth in claim 10 further including clamping means for securing the workpiece to said support means.

12. An apparatus as set forth in claim 10 including means for disengaging said pin means from the workpiece during the work performing operation so as to allow full freedom of operation of a work performing element on the workpiece.

13. An apparatus as set forth in claim 11 wherein said clamping means includes pad means for adjusting the workpiece relative to said reference point but in a direction different from said pin means.

14. An apparatus as set forth in claim 13 in which said clamping means are comprised of a series of articulated arms and cooperating pins.

15. An apparatus as set forth in claim 10 including track means associated with said pin means for use in initially directing the workpiece toward the finally desired working position.

16. An apparatus as set forth in claim 10 including further work performing elements for acting on an intermediate portion of the workpiece.

17. An apparatus as set forth in claim 10 including platform means for lowering the workpiece onto said support means and track means associated with said platform means for initially directing the workpiece toward the finally desired working position on said support means.

18. An apparatus for orienting and holding a workpiece in a work performing position as determined by a reference point located at the point of intersection of a pair of axes disposed in a common plane and for performing work on said workpiece, said apparatus comprising the combination of support means for slidably engaging the workpiece and initially orienting said workpiece relative to said reference point, a movable workpiece engaging pin means for engaging opposing portions of said workpiece for precisely orienting said workpiece relative to said reference point, common means for simultaneously moving said pin means into and out of engagement with said workpiece, means including work performing elements for maintaining the workpiece in the oriented and precise reference point position during the work performing operation, and common means for effecting the simultaneous traversal of said work performing elements across both of the opposing portions of said workpiece.

19. An apparatus as set forth in claim 18 further including clamping means for securing a workpiece to said support means.

20. An apparatus as set forth in claim 18 including means for disengaging said pin means from the workpiece during the work performing operation so as to allow full freedom of operation of a work performing element on the workpiece.

21. An apparatus as set forth in claim 19 wherein said clamping means includes pad means for adjusting the workpiece relative to said point but in a direction different from said pin means.

22. An apparatus as set forth in claim 19 in which said clamping means are comprised of a series of articulated arms and cooperating pins.

23. An apparatus as set forth in claim 18 in which said work performing elements are milling devices.

24. An apparatus as set forth in claim 18 including track means associated with said pins for use in initially directing the workpiece toward the finally desired working position on the support means.

25. An apparatus as set forth in claim 18 including further work performing elements for acting on an intermediate portion of the workpiece.

26. An apparatus as set forth in claim 25 in which said further work performing elements are drilling devices.

27. An apparatus as set forth in claim 18 including platform means for lowering the workpiece onto said support means and track means associated with said platform means for initially directing the workpiece toward the finally desired working position on the support means.

References Cited

UNITED STATES PATENTS 2,324,919   7/1943   Fine _____ 269—61

RICHARD H. EANES, JR., *Primary Examiner.*

U.S. Cl. X.R.

269—61